Patented Nov. 21, 1939

2,180,419

UNITED STATES PATENT OFFICE 2,180,419

VAT DYESTUFFS OF THE ANTHRAQUINONE-ACRIDONE SERIES

Erwin Kramer, Cologne-Deutz, Germany, assignor to General Aniline Works, Inc., New York, N. Y., a corporation of Delaware No Drawing. Application January 4, 1939, Serial No. 249,253. In Germany January 7, 1938

4 Claims. (Cl. 260—277)

The present invention relates to new vat dyestuffs of the anthraquinone-acridone series.

I have found that new and valuable vat dyestuffs are obtained by causing a 4-halogen-anthraquinone-acridone to react with a 2-(4'-aminophenyl)-anthraquinone. The reaction is preferably carried out in the presence of an organic solvent as, for instance, nitrobenzene or naphthalene, at an elevated temperature and in the presence of an acid-binding agent, such as an alkali salt of a weak acid, as, for instance, sodium carbonate, potassium carbonate or sodium acetate. The addition of copper powder or a copper salt as, for example, cuprous chloride or copper acetate, as a catalyst has proved to be advantageous. As valuable starting materials of the character stated above there may be mentioned 4-chloroanthraquinone-2,1-(N)-1',2'-(N)-benzeneacridone, 4,3',5'-trichloro-anthraquinone-2,1-(N)-1',2'-(N)-benzeneacridone and 4,3',4',5'-tetrachloro-anthraquinone-2,1-(N)-1',2'-(N)-benzeneacridone.

My new dyestuffs correspond to the following general formula:

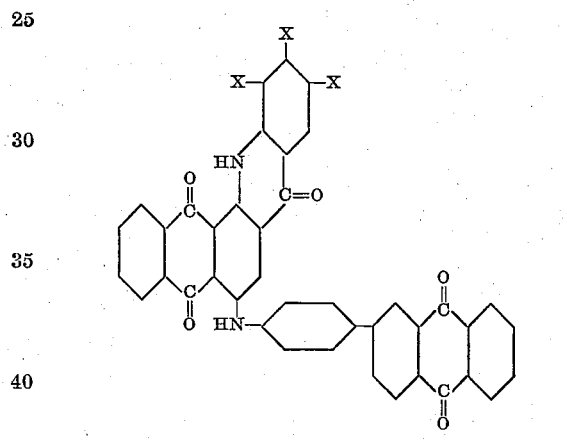

wherein X stands for halogen or hydrogen. They dye vegetable fibers olive-green shades which are distinguished by excellent fastness properties especially to chlorine.

The following examples illustrate the invention without, however, restricting it thereto, the parts being by weight:

Example 1

18 parts of 4-chloro-anthraquinone-2,1-(N)-1',2'-(N)-benzeneacridone,
45 parts of 2-(4'-aminophenyl)-anthraquinone,
7 parts of potassium carbonate and
0.5 part of cuprous chloride are heated to boiling in 50 parts of naphthalene for 8 hours. The reaction mixture is diluted with pyridine, filtered with suction at a temperature of 70° and washed with pyridine, water and dilute hydrochloric acid. The dyestuff is obtained in form of small grey needles, which are soluble in sulfuric acid with a brown-red coloration. It dyes cotton from a red-brown vat olive shades of a very good fastness to washing, boiling and to chlorine.

Example 2

22 parts of 4,3',5'-trichloro-anthraquinone-2,1-(N)-1',2'-(N)-benzeneacridone,
30 parts of 2-(4'-aminophenyl)-anthroquinone,
16 parts of anhydrous sodium acetate and
0.4 part of copper acetate are heated to boiling in 200 parts of naphthalene for 7 hours. After diluting the melt with pyridine it is filtered with suction at 90° and the residue is washed with hot pyridine until the running off is colorless. Then the dyestuff is extracted with hot water and hot dilute hydrochloric acid and for further purification it is boiled out with 150 parts of nitrobenzene after drying. The dyestuff thus obtained represents small olive needles soluble in sulfuric acid with a brown-orange coloration. It yields on cotton from a brown vat olive-green shades of excellent fastness properties to washing, boiling and to chlorine.

Example 3

12 parts of 4,3',4',5'-tetrachloro-anthraquinone-2,1-(N)-1',2'-(N)-benzeneacridone,
15 parts of 2-(4'-aminophenyl)-anthraquinone,
3 parts of potassium carbonate,
0.1 part of copper and
0.1 part of copper acetate are heated to boiling in 100 parts of naphthalene for 7 hours. After diluting the reaction mixture with dichlorobenzene or pyridine, the dyestuff is filtered with suction at 90° and washed with pyridine until the running off is colorless. Then the dyestuff is still washed out with hot water and hot dilute hydrochloric acid. It represents a dark powder being soluble in sulfuric acid with a brown-red coloration. The dyestuff yields on cotton from a brown vat yellowish olive-green shades of a very good fastness to washing, boiling and to chlorine.

I claim:

1. The compounds of the following formula

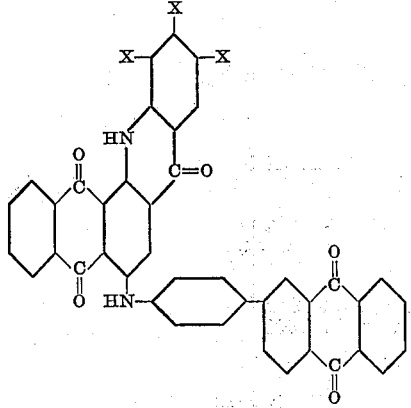

wherein X stands for a member of the group consisting of hydrogen and halogen.

2. The compound of the following formula

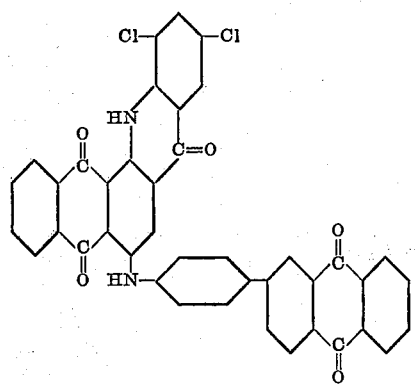

3. The compound of the following formula

4. The compound of the following formula

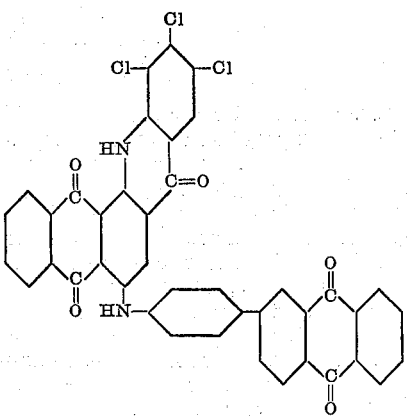

ERWIN KRAMER.